United States Patent
Krumpelman et al.

(10) Patent No.: US 10,180,736 B2
(45) Date of Patent: Jan. 15, 2019

(54) PEN WITH INDUCTOR

(71) Applicant: Synaptics Incorporated, San Jose, CA (US)

(72) Inventors: Doug Krumpelman, Coeur d'Alene, ID (US); Tom Vandermeijden, Los Gatos, CA (US); Kirk Hargreaves, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 121 days.

(21) Appl. No.: 14/675,622

(22) Filed: Mar. 31, 2015

(65) Prior Publication Data

US 2016/0147320 A1    May 26, 2016

Related U.S. Application Data

(60) Provisional application No. 62/085,135, filed on Nov. 26, 2014.

(51) Int. Cl.
| | |
|---|---|
| *G06F 3/033* | (2013.01) |
| *G06F 3/0354* | (2013.01) |
| *G06F 3/044* | (2006.01) |

(52) U.S. Cl.
CPC .......... *G06F 3/03545* (2013.01); *G06F 3/044* (2013.01)

(58) Field of Classification Search
CPC ............................. G06F 3/03545; G06F 3/044
See application file for complete search history.

(56) References Cited

U.S. PATENT DOCUMENTS

| | | |
|---|---|---|
| 5,023,408 A | 6/1991 | Murakami et al. |
| 5,120,907 A | 6/1992 | Shinbori et al. |
| 6,124,708 A | 9/2000 | Dames |
| 6,249,234 B1 * | 6/2001 | Ely ..................... G01D 5/2073 178/18.06 |
| 6,304,014 B1 | 10/2001 | England et al. |
| 6,522,128 B1 | 2/2003 | Ely et al. |
| 6,534,970 B1 | 3/2003 | Ely et al. |
| 6,641,044 B2 | 11/2003 | Plesko |
| 6,705,511 B1 | 3/2004 | Dames et al. |
| 7,406,393 B2 | 7/2008 | Ely et al. |
| 8,125,469 B2 | 2/2012 | Badaye et al. |
| 8,139,049 B1 | 3/2012 | Brandon et al. |
| 8,384,697 B2 | 2/2013 | Sung |

(Continued)

FOREIGN PATENT DOCUMENTS

| | | |
|---|---|---|
| TW | 448608 B | 8/2001 |
| WO | 2014128712 A1 | 8/2014 |

*Primary Examiner* — Patrick Edouard
*Assistant Examiner* — Joseph Fox
(74) *Attorney, Agent, or Firm* — Ferguson Braswell Fraser Kubasta PC

(57) ABSTRACT

A processing system includes a sensor module and a determination module. The sensor module is coupled to sensor electrodes and is the sensor module configured to drive the sensor electrodes with sensing signals at a first resonance frequency of the pen. The determination module is configured to obtain, concurrently with the driving of the sensor electrodes, a measurements that are based on effects of the sensing signals, and a resonance of the pen in a sensing region. The determination module is further configured to determine positional information of the pen in the sensing region based on the measurements, and report the positional information.

18 Claims, 10 Drawing Sheets

(56) References Cited

U.S. PATENT DOCUMENTS

| | | | |
|---|---|---|---|
| 8,402,391 B1* | 3/2013 | Doray | G06F 3/0482 715/834 |
| 8,493,359 B2 | 7/2013 | Wright et al. | |
| 8,508,510 B2 | 8/2013 | Kim | |
| 8,773,404 B2 | 7/2014 | Wei et al. | |
| 9,766,724 B2* | 9/2017 | Feng | G06F 3/03545 |
| 2001/0001430 A1 | 5/2001 | Ely et al. | |
| 2001/0006369 A1 | 7/2001 | Ely | |
| 2004/0233178 A1 | 11/2004 | Silk et al. | |
| 2005/0021269 A1 | 1/2005 | Ely et al. | |
| 2005/0174259 A1 | 8/2005 | Ely | |
| 2007/0085836 A1 | 4/2007 | Ely | |
| 2009/0251434 A1 | 10/2009 | Rimon et al. | |
| 2010/0238121 A1 | 9/2010 | Ely | |
| 2011/0122087 A1* | 5/2011 | Jang | G06F 3/044 345/174 |
| 2011/0205191 A1 | 8/2011 | Hou et al. | |
| 2011/0267292 A1 | 11/2011 | Yeh | |
| 2011/0291944 A1 | 12/2011 | Simmons et al. | |
| 2011/0304577 A1 | 12/2011 | Brown et al. | |
| 2012/0043142 A1 | 2/2012 | Grivna | |
| 2012/0105361 A1 | 5/2012 | Kremin et al. | |
| 2012/0313865 A1 | 12/2012 | Pearce | |
| 2012/0327040 A1 | 12/2012 | Simon et al. | |
| 2013/0082950 A1* | 4/2013 | Lim | G06F 3/0418 345/173 |
| 2013/0088465 A1* | 4/2013 | Geller | G06F 3/03545 345/179 |
| 2013/0141084 A1 | 6/2013 | Hsieh et al. | |
| 2014/0013259 A1 | 1/2014 | Thomas et al. | |
| 2014/0049703 A1 | 2/2014 | Hu | |
| 2014/0104224 A1* | 4/2014 | Ih | G06F 3/044 345/174 |
| 2014/0132529 A1 | 5/2014 | Jeong | |
| 2014/0152623 A1 | 6/2014 | Lee et al. | |
| 2014/0160045 A1 | 6/2014 | Park et al. | |
| 2014/0176495 A1 | 6/2014 | Vlasov | |
| 2014/0184245 A1* | 7/2014 | Hara | G06F 3/038 324/655 |
| 2014/0191711 A1 | 7/2014 | Leydon | |
| 2015/0123923 A1* | 5/2015 | Stern | G06F 3/03545 345/173 |
| 2015/0153845 A1* | 6/2015 | Chang | G06F 3/03545 345/179 |
| 2015/0199035 A1* | 7/2015 | Chang | G06F 3/03545 345/179 |
| 2015/0338933 A1* | 11/2015 | Holz | G06F 3/0304 345/179 |
| 2016/0139732 A1* | 5/2016 | Takeda | G06F 3/044 345/174 |

* cited by examiner

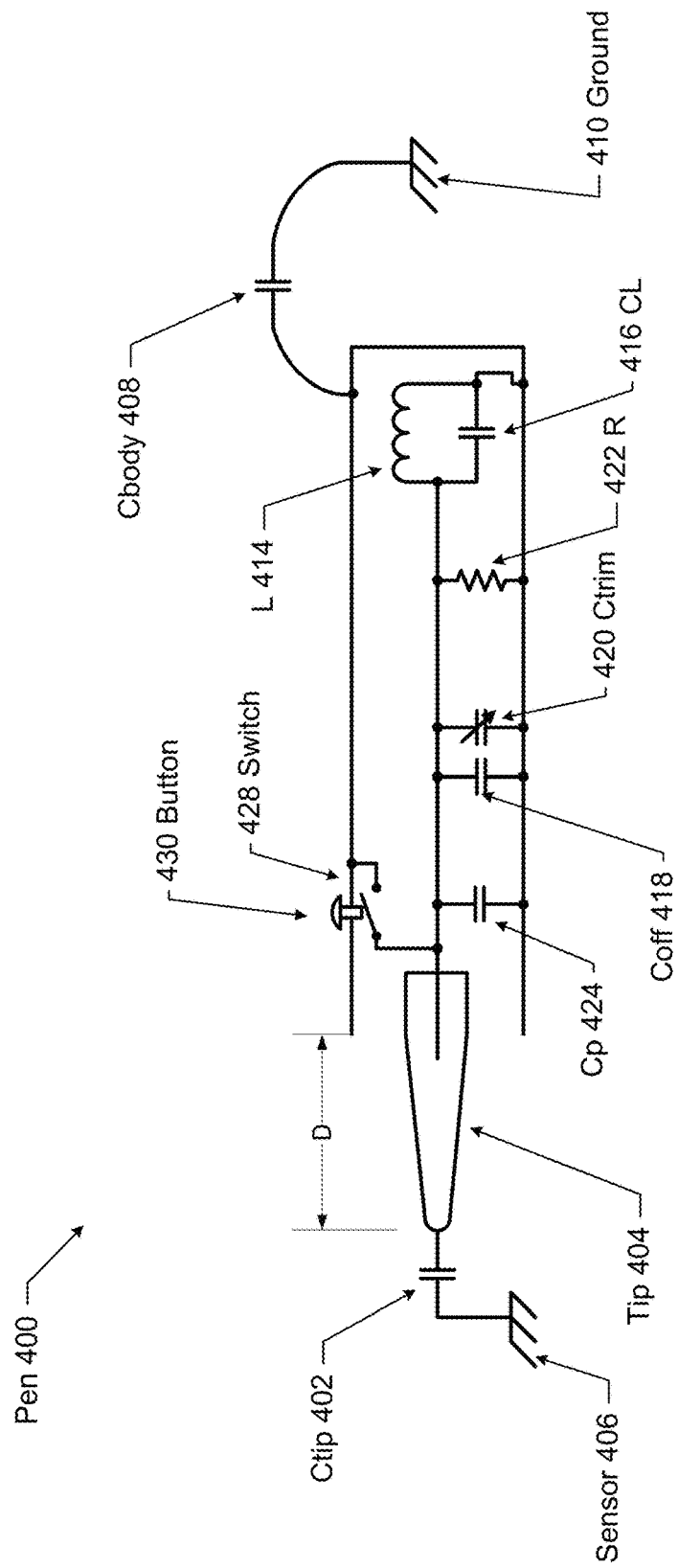
FIG. 4.1

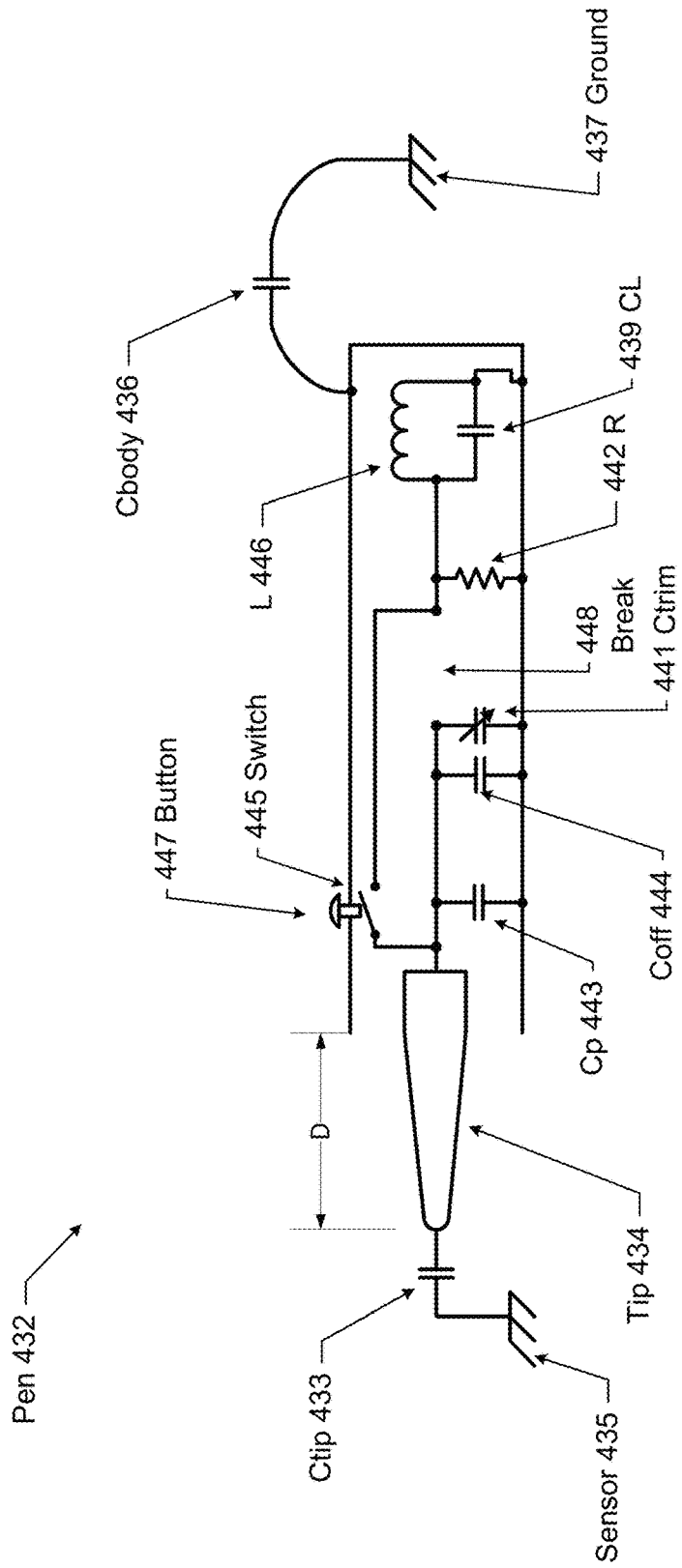
FIG. 4.2

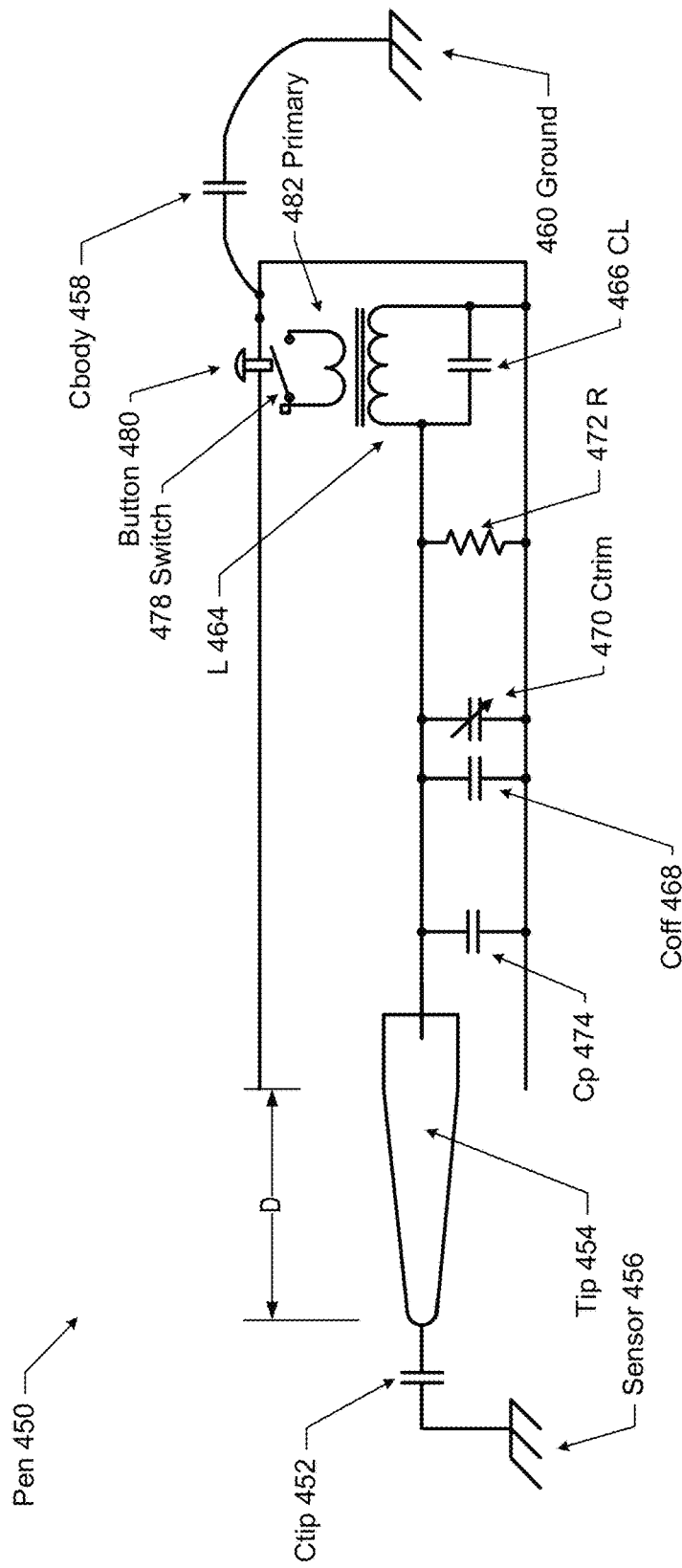
FIG. 4.3

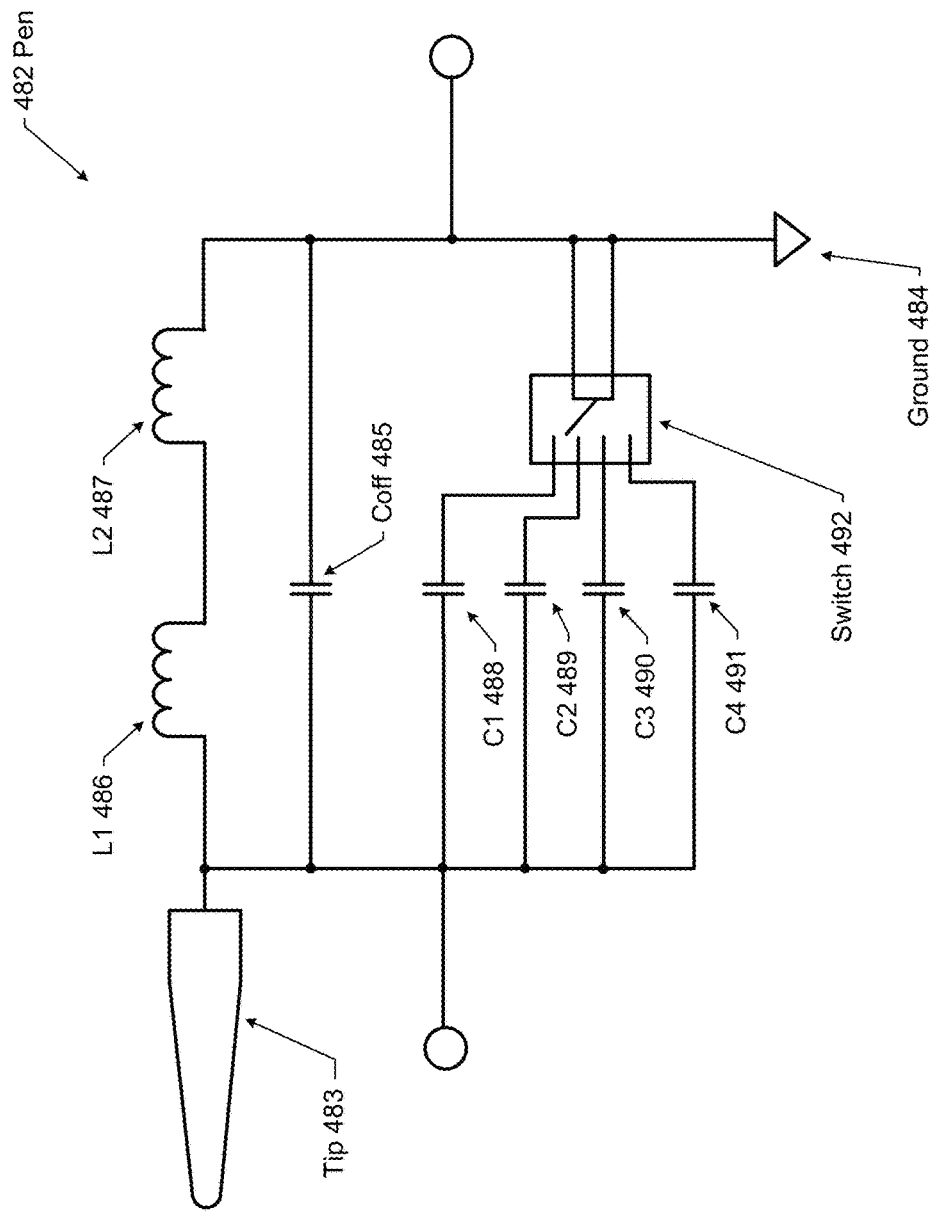
FIG. 4.4

PEN WITH INDUCTOR

CROSS-REFERENCE TO RELATED APPLICATIONS

This application claims priority under 35 U.S.C. § 119(e) to U.S. Provisional Patent Application Ser. No. 62/085,135, filed on Nov. 26, 2014 and entitled, "Resonating Passive Pen", which is incorporated herein by reference in its entirety.

FIELD

This invention generally relates to electronic devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, embodiments relate to a processing system that includes a sensor module and a determination module. The sensor module is coupled to sensor electrodes and is the sensor module configured to drive the sensor electrodes with sensing signals at a first resonance frequency of the pen. The determination module is configured to obtain, concurrently with the driving of the sensor electrodes, a measurements that are based on effects of the sensing signals, and a resonance of the pen in a sensing region. The determination module is further configured to determine positional information of the pen in the sensing region based on the measurements, and report the positional information.

In general, in one aspect, embodiments relate to a system that includes a pen including an inductor, where the pen has resonance frequency. The system further includes an input device that includes sensor circuitry and a processing system. The sensor circuitry is configured to transmit sensing signals at the resonance frequency of the pen. The processing system is configured to drive the sensor electrodes with the first sensing signals at the resonance frequency of the pen, and obtain, concurrently with the driving of the sensor electrodes, measurements that are based on effects of the sensing signals, and a resonance of the pen in a sensing region. The processing system is further configured to determine positional information of the pen in the sensing region based on the measurements, and report the positional information.

In general, in one aspect, embodiments relate to a passive pen. The passive pen includes a pen body, a tip disposed at an end of the pen body, a first circuit segment for coupling the tip to a ground, a second circuit segment that includes an inductor, a trim capacitor configured for a first resonance frequency, and a switch. The switch is configured to change between a first state and a second state. The first state connects the tip to the first circuit segment. The second state connects the second circuit segment to the tip and isolates the first circuit segment. In one or more embodiments of the invention, the passive pen has the resonance frequency in the second state.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements.

FIGS. 1, 2, 3, 4.1, 4.2, 4.3, and 4.4 are block diagrams of example systems in accordance with an embodiment of the invention.

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present invention provide input devices and methods that facilitate improved usability. In particular, one or more embodiments are directed to a pen that includes an inductor and a corresponding sensing region. With the inductor, the pen has a corresponding resonance frequency. The sensing region may be configured to transmit on the resonance frequency of the inductor on the pen, and detect different states of the pen.

Figure 1:
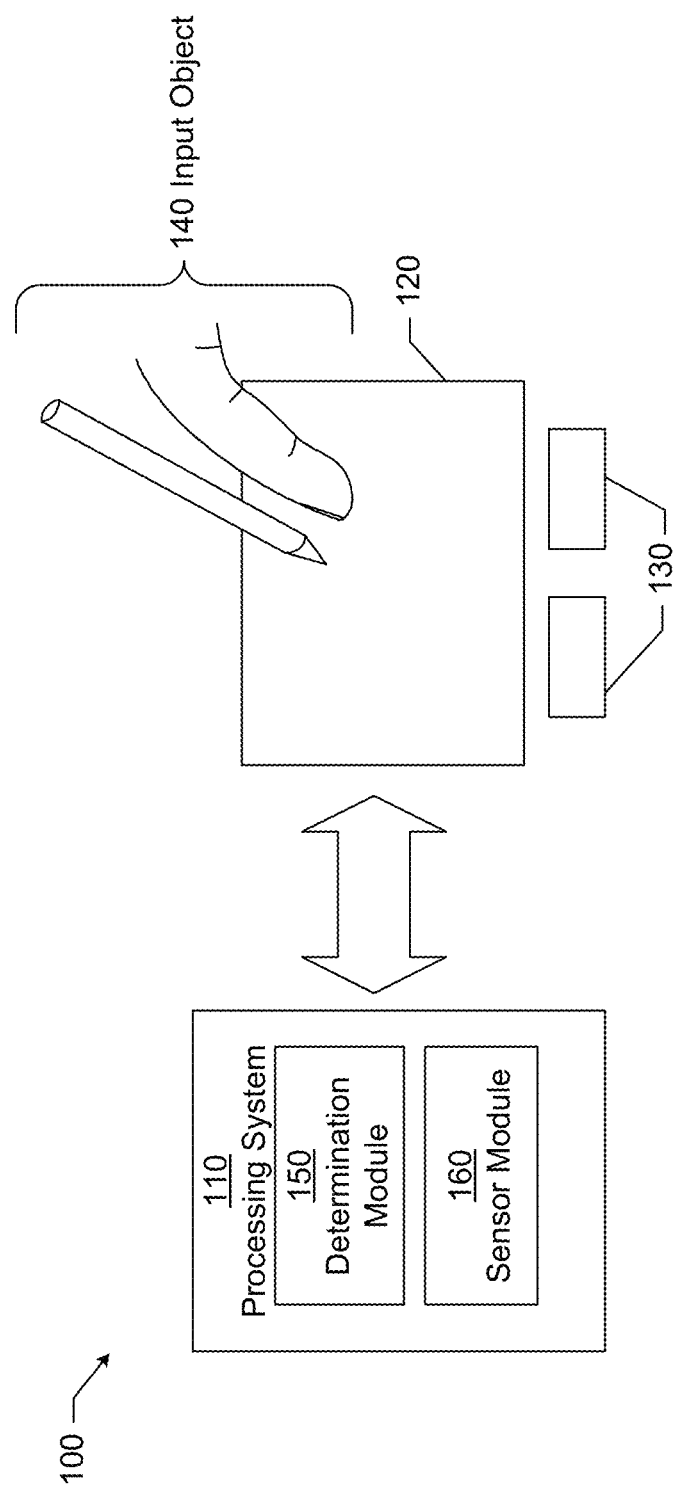

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects may exist in the sensing region (120). Further, which particular input objects are in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

It should be understood that while many embodiments of the invention are described in the context of a fully-functioning apparatus, the mechanisms of the present invention are capable of being distributed as a program product (e.g., software) in a variety of forms. For example, the mechanisms of the present invention may be implemented and distributed as a software program on information-bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

One or more embodiments are directed to input object (140) being a pen with an inductor in the sensing region. In one or more embodiments, the pen is a passive pen, or a pen that is not designed to store energy for an extended period of time. A passive pen is type of input object that is used on capacitive sensing devices. The passive pen interacts with a capacitive sensing device by affecting the measured capacitance of the sensing device. In other words, a passive pen interacts with the input device in a way similar to how a finger interacts with the input device. In contrast to an active pen that sends an electrical signal to an input device using an internal power source, a passive pen does not utilize active components to transmit a signal to the sensing device. Rather, the only input to the capacitive sensing device is based on the detection, by the capacitive sensing device, of the passive pen. Therefore, in contrast to an active pen, a passive pen does not typically include a battery or other power source. A passive pen may also be referred to as a passive stylus.

In one or more embodiments of the invention, a passive pen does not include electrical components to interact with the input device. Thus, while the passive pen may include electrical components only for decorative aspects, such as to include a light, the passive pen exclusively interacts with the input device using mechanical components. In other embodiments, the passive pen excludes all electrical components. While embodiments of the disclosed invention are primarily described for use with a passive pen, semi-passive pens that are charged by the sensing region and transmit using the charge and active pens may also be utilized.

Figure 2:
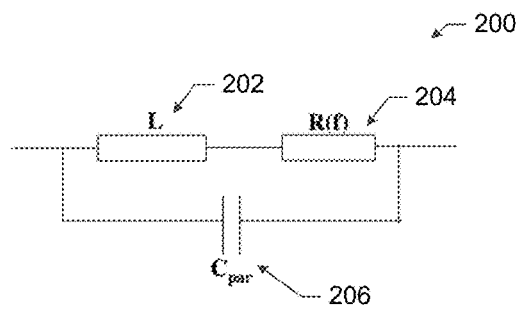

FIG. 2 shows an example circuit diagram (200) of a pen in accordance with one or more embodiments of the invention. As shown in FIG. 2, the pen includes an inductor (202). The pen may also have parasitic resistance (204) and parasitic capacitance (206). The parasitic resistance (204) and parasitic capacitance (206) may have various degrees of magnitude and may be accommodated during the tuning procedure. A capacitance (not shown) may also exist between the input device (shown in FIG. 1) and the pen.

In one or more embodiments of the invention, the pen includes functionality to resonate at substantially the same frequency of the driving waveform of the sensor electrodes of the input device. In other words, the sensor electrodes coupled to the processing system (110) are driven with sensing signals at a defined frequency. The pen is configured to have a resonance frequency that is substantially the same as the defined frequency of the sensing signals. In other words, the resonance frequency is within a threshold distance of the defined frequency of the sensing signals. Thus, the effects of the pen in the sensing region are amplified by the pen having substantially the same resonance frequency.

In some embodiments, the pen includes a tip, a first circuit segment, a second circuit segment, and a switch. The first circuit segment may be for coupling the tip to a ground. The second circuit segment may include the inductor. The switch includes functionality to change between a first state that is non-resonating, and a second state that is resonating. In the resonating state, the inductor (202) is part of the circuit and causes the system to resonate. In the non-resonating state, the inductor is bypassed or shorted, and, thus, the pen does not resonate. Various mechanical elements may be used to switch the pen between the non-resonating state and the resonating state. In other embodiments, the pen may switch to a non-resonating state by altering the resonant frequency of the pen so that it is no longer substantially the same as the frequency of the sensing signals. Examples of pens having the tip, a first circuit segment, a second circuit segment, and a switch are discussed below and in reference to FIGS. 3, 4.1, 4.2, 4.3, and 4.4. One or more embodiments of the invention may deviate from the examples shown in FIGS. 3, 4.1, 4.2, 4.3, and 4.4 and described below without departing from the scope of the invention.

Figure 3:
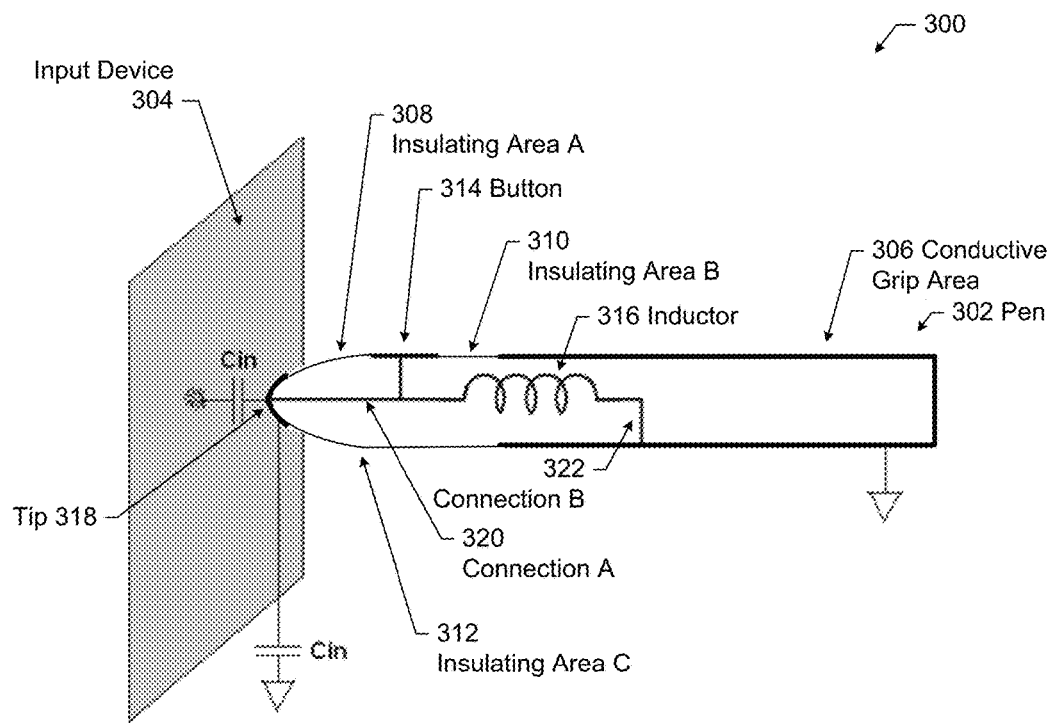

FIG. 3 shows an example circuit diagram having a pen that switches between a resonating state and a non-resonating state. As shown in FIG. 3, a system (300) may have a pen (302) and an input device (304) in accordance with one or more embodiments of the invention.

The pen (302) may have a conductive grip area (306), insulating areas (e.g., insulating area A (308), insulating area B (310), insulating area C (312)), a button (314), and inductor (316). The insulating area (e.g., insulating area A (308), insulating area B (310), insulating area C (312)) is made of insulating material. The conductive grip area (306), button (314), tip (318), inductor (316), and connections (e.g., connection A (320), connection B (322)) are made of conductive material. For example, inductor (316) and connections (e.g., connection A (320), connection B (322)) may be made of conductive wire.

As shown in FIG. 3, the input device (304) is a capacitive input device. In other words, when the tip (318) is within the sensing region, the presence of the pen affects the capacitance at the corresponding location in the sensing region. A human may hold the pen at the conductive grip area (306). When the human holding the pen (302) is not touching the button (314) or tip (318), the human grounds the tip (318) to Earth ground through connection A (320), inductor (316), and connection B (322). Thus, when the human is not touching the button or tip, the pen is in a resonating mode. In other words, an inductor-capacitor (LC) circuit is generated causing the pen to have a resonance frequency. When a human touches the button (314), the tip is grounded through connection A (320) and the button (314), thereby, bypassing the inductor (316). In other words, through the conductive surface of the button, the human may short out the resonating circuit to the high ground mass (HGM) state. Thus, the pen is in a non-resonating mode.

Although FIG. 3 shows a flat button, a compressible material may be placed over the button to slow the selection of the button. For example, the compressible material may be a dome made of non-conductible compressible material, such as rubber or foam, that is placed over the button. The non-conductive dome may slow the speed of transition between resonating and non-resonating mode. In particular, the human pressing the button may slow the speed at which the inductor is bypassed in the system.

Further, FIG. 3 is only an example of a pen, the actual shape, size, and relative positions of the various components may be different than shown in FIG. 3 without departing from the scope of the invention. Further, although FIG. 3 shows the button on the side and proximate to the tip, the button may be in a different position. For example, the button may be in the tip, or in an end that is opposite of the tip. In the case of the button in tip, for example, the button may be a microswitch or other switch mechanism that initiates a switch when the user presses the pen into the input device at a defined force.

FIG. 4.1 shows a circuit diagram of a pen in accordance with one or more embodiments of the invention. In some embodiments, the resonance frequency of the pen may be modified using a trim capacitor. FIG. 4.1 shows an example circuit diagram of a pen (400) that includes an LC circuit in accordance with one or more embodiments of the invention. Ctip (402) is the capacitance from the tip (404) to the capacitive sensor (406). Cbody (408) is the capacitance from the pen (400), through the human holding the pen (400), to earth ground (410). Cbody (404) is in series with Ctip (402) and may be larger than Ctip (402).

Cp (412) is parasitic capacitance from the tip (404). The value of Cp (412) may be low. L (414) is an inductor. For example, the inductor L (414) may have an inductance of 100 millihenry (mH) and a self-resonance frequency of or above 360 kiloherz (kHz). Other amounts of inductance and self-resonance frequencies may be used without departing from the scope of the invention. Further, although FIG. 4.1 shows a single inductor, multiple inductors may be used to generate a high inductance in a small physical package. In such embodiments, one or more transformer secondary windings may be used in series. In one embodiment, the transformer primary winding may be floating while the secondary winding is grounded.

Continuing with FIG. 4.1, CL (416) is the parasitic parallel capacitance of the inductor (414). In one or more embodiments of the invention, the self-resonance frequency of the inductor, based on CL (416), is considered when selecting an inductor and designing the pen.

Continuing with FIG. 4.1, Coff (418) is a static trim capacitance that may be used to set the resonance frequency of the pen in an approximate range. A variable trim capacitance Ctrim (420) may be used to fine tune the capacitance in order to obtain the series resonance. In some embodiments, Coff (420) may be set in a factory while Ctrim (422) is a variable capacitance that may be adjusted by an end user, such as by using a selectable knob that is attached to the capacitor. In other words, Coff (420) may be used to get close to the desired resonance frequency and Ctrim (422) may be used for fine tuning. In other embodiments, Coff (420) and Ctrim (422) are both set as part of the manufacturing process. As the frequency lowers, the pen voltage lowers and a lower signal level results.

Further, Cp (424) is a parasitic capacitance. As the body of the pen narrows, Cp (424) increases. As the capacitance is added, the resonance frequency is reduced as evident by the following equation Eq. 1.

$$f = \frac{1}{2\pi\sqrt{L*C}} \quad \text{Eq. 1}$$

In Eq. 1, f is the resonant frequency, C is capacitance, and L is the amount of inductance. As shown, the resonant frequency is inversely related to both the amount of inductance and the capacitance.

In one or more embodiments of the invention, R (422) is an external damping resistance. R may modify the amplitude of the resonance frequency and maintain the phase within certain parameters.

Continuing with the pen (400), a distance D (426) may exist between the tip (404) and the pen body. Similar to the embodiment shown in FIG. 3, the pen body and the tip may be made of conductive material, while, the region between the tip and the pen body has insulating material. The distance prevents the pen from being grounded by a person holding the pen. In one or more embodiments of the invention, the distance D may be, for example 15 millimeters. Other distances may be used without departing from the scope of the invention.

Further, similar to FIG. 3, the pen (400) may have switch (428) for changing the pen from a resonating mode to a non-resonating mode. In one or more embodiments of the invention, the pen may have a default of a resonating mode in order to have an increased signal. In such embodiments, the default position of the switch (428) is in an open state in order to be in resonating mode. The switch may be changed to a closed state. For example, a selectable button (430) may be connected to the switch in order to change the switch to the closed state. In the closed state, the inductor is bypassed and the tip is grounded to Earth-ground through the button and human. It should be noted that resonating mode and non-resonating mode may also be identified as two resonating modes with different resonating frequencies. A system may be configured so that a first resonating frequency corresponds to a sensing signal frequency of the input device and the corresponding mode is then deemed resonating mode. In some embodiments, which resonating frequency corresponds to resonant mode may depend on which of the resonant frequencies corresponds to the frequency of the sensing signals driven by the input device.

FIG. 4.1 is merely exemplary and any other design, circuit element, or values may be used in order to achieve a resonant passive pen. In certain embodiments, a switch may be coupled to the primary inductor in order to switch between a resonant and non-resonant state.

In one or more embodiments of the invention, the resonant frequency may be tuned by changing the inductance of the system, while keeping the pen voltage constant. In such embodiments, the inductor L (414) may be tunable. In other embodiments, the pen (400) may include a tunable inductor (not shown). For example, the inductance on the tunable inductor may be larger and in parallel to the inductance of the primary inductor, lowering the effective inductance. A lower inductance can result in a higher frequency, which may be useful when the system is near or at the self-resonant frequency of the transformer secondary. If the inductor is tunable or a separate tunable inductor is included, a selectable knob may be connected to the tunable inductor to change the inductance of the system.

In one embodiment a pen's resonant frequency is matched to the sensing signal frequency of an input device. The sensing signal is transmitted by the input device in order to perform capacitive input detection. In one or more embodiments of the invention, resonator components (e.g., Cp (424), Coff (418), Ctrim (420), R (422), and L (414)) may be shielded from the environment external to the pen (400) to minimize frequency change due to finger grip or proximity.

FIG. 4.2 is alternative circuit diagram of a pen (432) in accordance with one or more embodiments of the invention. In FIG. 4.2, the Ctip (433), tip (434), sensor (435), Cp (443), Coff (444), Ctrim (441), R (442), CL (439), ground (437), inductor L (446), button (447), and Cbody (436) may be the same or similar to the identically named components in FIG. 4.1. In particular, FIG. 4.2 shows an alternative configuration of the switch (478) with respect to the inductor (446) and pen (432). In the alternative, when the switch (445) is open because the button (447) is not pressed, coupling through Cp (443), Coff (444) and Ctrim (441) maintains the pen at high ground mass level when a user is holding the pen. In other words, the break (448) and switch (445) disconnects the inductor (446) from the tip (434). When the switch (445) is closed because of the press of the button (447), the inductor (446) is connected and resonates with Cp (443), Coff (444), and Ctrim (441). The design in FIG. 4.2 may avoid the problem of finger capacitance coupling onto the button during Ctrim (441) tuning.

FIG. 4.3 is alternative circuit diagram of a pen (450) in accordance with one or more embodiments of the invention. In FIG. 4.2, the Ctip (420), tip (454), sensor (456), Cp (474), Coff (468), Ctrim (470), R (472), CL (466), ground (460), L (464), switch (478), button (430), and Cbody (456) may be the same or similar to the identically named components in FIG. 4.1. In particular, FIG. 4.3 shows an alternative configuration of the inductor (464) and switch (478) with respect to the pen (450). In the alternative, the secondary of the transformer may be used for the inductor L (464). Further, the switch (478) may be located at the primary side (482) of the transformer including L (464) and primary (482). If the secondary to primary turn ratio is K to 1, then the capacitance on the switch may be $1/k^2$ large. Thus, an amount of frequency shift caused by a change in capacitance due to an approaching input object may be reduced. Although not shown in FIG. 4.3, similar to FIG. 4.1, a tunable inductor may be placed on the primary (482).

Although not shown in FIGS. 1, 2, 3, 4.1, 4.2, and 4.3 the pen may include a selectable button or other such component that allows an end user to switch the pen between two or more different resonance frequencies. For example, the selectable button may be operatively connected to one or more inductors and may be configured to switch between the multiple resonance frequencies. By switching between multiple resonance frequencies, the input device may be configured to identify different state changes of the pen. For example, the resulting signal may have a first peak magnitude at a first resonance frequency, a second peak magnitude at a second resonance frequency, and a third peak magnitude at a third resonance frequency. Additionally, the pen may be able to drive sensing signals at multiple frequencies that may correspond to resonant frequencies of the pen. For example, for a pen with two resonant frequencies, frequency A and frequency B, the input device may drive sensing signals at frequency A. The detected resulting signal may be elevated if the resonant frequency of the pen is at or near frequency A. Similarly, the input device may drive sensing signals at frequency B and expect an elevated resulting signal level if the resonant frequency of the pen is at or near frequency B. The input device may be configured to report the current state as part of positional information to a host device, which uses the state to select a color for using in a draw program.

FIG. 4.4 is alternative circuit diagram of a pen (482) that allows for the selection of different resonance frequencies in accordance with one or more embodiments of the invention. In FIG. 4.4, the tip (483), ground (484), Coff (485) may be the same or similar to the identically named components in FIG. 4.1. FIG. 4.4 shows a configuration for a pen which has four selectable resonance frequencies. In particular, inductor L1 (486) is in series with inductor L2 (487), and both are in parallel with capacitor Coff (485). Inductor L1 (486) and inductor L2 (487) may be combined into a single inductor. The pen may also include additional capacitors C1 (488), C2 (489), C3 (490), and C4 (491), which each have a different amount of capacitance. Thus, an LC circuit that has the same inductor has a variable resonance frequency depending on which of C1 (488), C2 (489), C3 (490), and C4 (491) is selected. Switch (492) is configured to connect C1 (488), C2 (489), C3 (490), and C4 (491) to the circuit and, therefore, change the resonance frequency. In one or more embodiments of the invention, switch (492) may be controlled by a user, such as via an external switching mechanism on the pen (482).

While FIGS. 1, 2, 3, 4.1, 4.2, 4.3, and 4.4 show various configurations of components, other configurations may be used without departing from the scope of the invention. For example, various components may be combined to create a single component. As another example, the functionality performed by a single component may be performed by two or more components. By way of an example, two or more various configurations of FIGS. 4.1, 4.2, 4.3, and 4.4 may be combined into other configurations of a pen without departing from the scope of the invention. For example, components may be added, modified, or removed FIGS. 4.1, 4.2, 4.3, and 4.4 to create different configurations that do not depart from the scope of the invention. Further, the various configurations may be modified to change whether the selection of the button causes the pen to resonate. For example, the configurations in FIGS. 4.1, 4.2, and 4.3 may be modified such that selection of the button causes the pen to resonate and no selection of the button shorts the inductor.

In some embodiments, the resonance frequency pen with inductor is tuned for a particular input device. For example, during a manufacturing process, a manufacturer may tune the pen by trimming the capacitor or tuning the inductor to match the resonance frequency of the sensing signals transmitted on the particular input device. By way of another example, the pen may include an adjustable knob to alter the resonance frequency of the pen to any of multiple possible resonance frequencies. In operation, the user may adjust the adjustable knob to change the resonance frequency. In some embodiments, the input device may include functionality to detect the resonance frequency of the pen and self-configure to match the resonance frequency. Further, any combination of any of the above may be performed to configure the pen and/or input device to have matching resonance frequencies. For example, the manufacturer may tune the pen during the manufacturing process, and, when deployed, a human may adjust the adjustable knob while the input device detects the resonance frequency.

Figure 5:
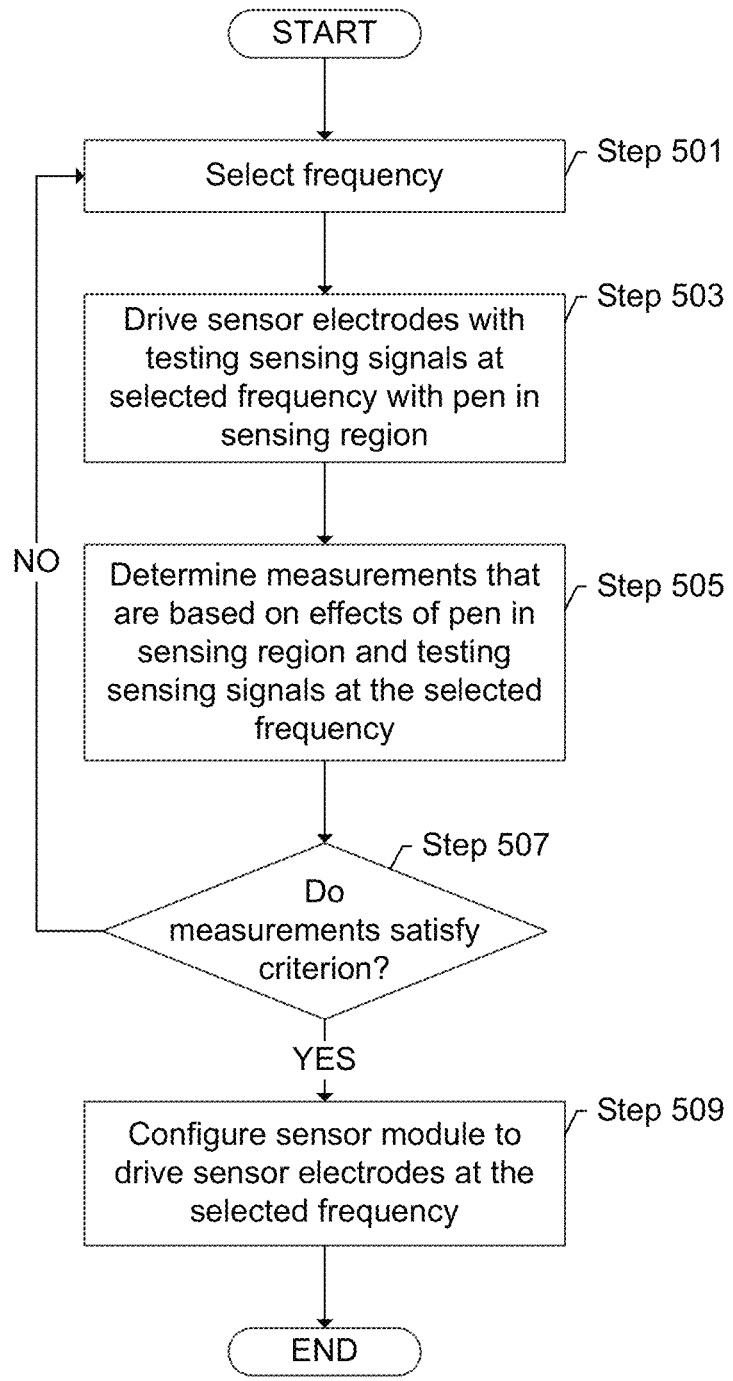
FIGS. 5 and 6 are example flowcharts in accordance with one or more embodiments of the invention.

FIG. 5 shows a flowchart for configuring the input device to operate at the resonance frequency of the pen in accordance with one or more embodiments of the invention. FIG. 5 may be performed, for example, by the processing system using the determination module and sensor module shown in FIG. 1 in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In Step 501, a frequency is selected in accordance with one or more embodiments of the invention. In one or more embodiments of the invention, initially, the frequency may be randomly selected or selected based on a priori information. For example, if the model of the pen is known, then the initial frequency may be determined from information about the resonance frequency of the particular model of the pen. By way of another example, if pens have a resonance frequency within a particular range of resonance frequencies, then the frequency is selected from the range. Other techniques for selecting the initial frequency may be used without departing from the scope of the invention.

In Step 503, the sensor electrodes are driven with testing sensing signals at the selected frequency while the pen is in the sensing region in accordance with one or more embodiments of the invention. As part of performing the configuration, a utility software program for the input device may instruct the user to place the pen in the sensing region. In other words, the user may be instructed, that for configuring the pen to be used with the input device, the pen should be present in the sensing region. At the end of a predefined amount of time or upon receiving acknowledgment from the user, the input device may start the configuration. While the pen is in the sensing region, the sensor module may drive the sensor electrodes with sensing signals that are at the selected frequency.

In Step 505, a set of measurements are determined in accordance with one or more embodiments of the invention. The set of measurements are based on effects of the pen in the sensing region and testing sensing signals at the selected frequency. In one or more embodiments of the invention, mutual capacitance sensing is performed and the set of measurements are the measured difference between received sensing signals and the testing sensing signals. Additionally or alternatively, absolute capacitive sensing may be performed and the measurements measure the effects of the pen in the sensing region when sensing signals are transmitted at the selected frequency.

In Step 507, a determination is made whether the measurements satisfy a criterion in accordance with one or more embodiments of the invention. In one or more embodiments of the invention, the criterion may be a pre-defined threshold for a peak magnitude of the measurements. In such embodiments, determining whether the measurements satisfy a criterion includes identifying the peak magnitude and determining whether the peak magnitude is greater than the pre-defined threshold. In some embodiments, exceeding a threshold signal level indicates that the frequency of the driven sensing signals is substantially similar to the current resonant frequency of a pen in the sensing region.

In accordance with one or more embodiments of the invention, the criterion may be matching a pattern of the measurements in accordance with one or more embodiments of the invention. In one or more embodiments of the invention, when the pen is present in the sensing region, the selected frequency is near the resonance frequency, and mutual capacitance sensing is used, the measurements may have a peak measurement and one or more tails extending from the peak measurement. A tail is a line of elevated or increased measurements that extend from the position of the peak measurement and have progressively lower values from the peak measurement. When the pen is perpendicular to the surface of the input device, four tails may result from the sensing signals at the resonance frequency of the pen. When the pen is at an angle, the tail may be in the opposite direction of the heading direction of the pen. Thus, determining whether the measurements satisfy the criterion may be performed by determining whether the relative magnitude of the measurements with respect to each other satisfy a pattern having tails.

Other criteria may be used without departing from the scope of the invention. If the measurements do not satisfy a criterion, the flow may return to Step 501. When the flow returns to Step 501, the next frequency selected may be randomly selected, selected based on a pattern for selection, selected based on the measurements acquired during a previous iteration, selected based on another criterion, or selected based on a combination of methodologies for selection.

If the measurements satisfy a criterion, the flow may proceed to Step 509 in accordance with one or more embodiments of the invention. In Step 509, the sensor module is configured to drive the sensor electrodes at the selected frequency in accordance with one or more embodiments of the invention. In other words, the sensor module determines that the selected frequency in Step 501 is the same as or substantially the same as the resonance frequency of the pen. Thus, the sensor module may transmit at the identified resonance frequency to detect whether the pen has that resonant frequency at a given time.

In some embodiments, the pen may be capable of switching between selectable resonance frequencies. For example, a button or knob with predefined stops on the pen may be selectable by the user to change the resonance frequency. In such a scenario, for each resonance frequency of the pen, the resonance frequency may be selected on the pen and the operations of FIG. 5 performed.

Figure 6:
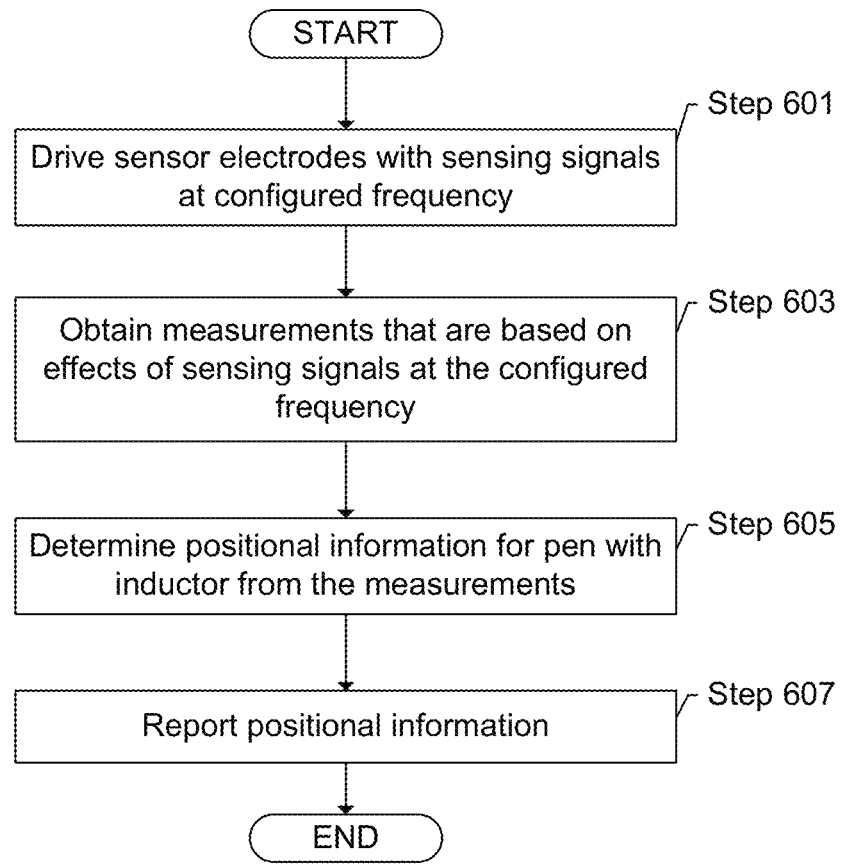

FIG. 6 shows a flowchart for detecting a current state of a pen having an inductor in the sensing region in accordance with one or more embodiments of the invention. In particular, FIG. 6 shows a flowchart for determining positional information for a pen having an inductor in accordance with one or more embodiments of the invention.

In Step 601, the sensor electrodes are driven with sensing signals at the configured frequency in the sensing region in accordance with one or more embodiments of the invention. In one or more embodiments of the invention, the sensing signals are transmitted at a resonance frequency of the pen. The sensing signals are at the resonance frequency when the sensing signals are at least substantially near the resonance frequency. In Step 603, a set of measurements are obtained in accordance with one or more embodiments of the invention. In one or more embodiments of the invention, the set of measurements may be obtained concurrently with driving the sensor electrodes. For example, the set of measurements may be obtained at overlapping times with driving the sensor electrodes. In one or more embodiments, the set of measurements may be obtained at least substantially simultaneously with the driving. For example, in some embodiments sensing signals may be driven on one or more transmitter electrodes concurrently with receiving resulting signals on one or more receiver electrodes. The set of measurements are based on effects of the sensing signals at the configured frequency. The measurements may also be based on the pen in the sensing region or another input object in the sensing region. For example, if the pen is resonating, the measurements may be based on the resonance of the pen in the sensing region. Further, although not presented in FIG. 6 or 5, the effects may also include environmental noise surrounding the pen and the input device. Determining the measurements may be performed as discussed above with reference to Step 505.

In Step 605, positional information is determined from the measurements in accordance with one or more embodiments of the invention. The determined positional information may include location of the pen, the state of the pen, and other aspects of the pen in the sensing region. Determining the location may be performed using techniques known in the art. The state of the pen may include whether a button is selected, the heading direction, the angle of the pen, at which resonance frequency the pen is resonating, the handedness of the user using the pen, a track direction of the pen, and other aspects of the state of the pen.

For example, one method for determining whether a button is selected is based on the relative magnitude of the measurements with respect to other measurements acquired. In particular, if the pen is in a resonating mode that is resonating at or substantially the same as the frequency of the sensing signals, the peak magnitude of the measurements is a threshold difference greater than when the pen is in a non-resonating mode. Thus, determining whether the pen is in resonating mode may be performed by determining a relative magnitude of the peak measurement with respect to a measurement having a lower peak measurement, and determining whether the relative magnitude satisfies a threshold difference. If the relative magnitude satisfies the threshold, the pen is determined to be in resonating mode.

Another method for determining whether a button is selected may be performed using a resonating detection threshold. For example, the determination module may be configured with a resonating detection threshold for the pen. In such embodiments, determining whether the pen is in resonating mode may be performed by determining whether the peak magnitude satisfies the resonating detection threshold. Depending on the pen, the button selection may be resonating mode or non-resonating mode, which may be configured in the input device or host device.

The heading direction of the pen may be determined from the pattern of the measurements in accordance with one or more embodiments of the invention. In particular, as discussed above with reference to Step 507, a tail in the measurements is in the opposite direction of the heading direction of the pen. Thus, determining a position of the tail may be performed by determining in which direction increased measurements extend outward from the location of peak magnitude.

In one or more embodiments of the invention, the angle of elevation of the pen may be determined based on the pattern of measurements. In particular, the more perpendicular to the pen is to the input device, the number of tails increases to four, where each tail has approximately the same magnitude radiating outward. As the angle of the pen decreases toward the sensing region, sensing region detects the change in capacitance along the length of the pen, and the tail that is in the opposite direction of the heading direction of the pen increases in magnitude, while the remaining tail(s) may decrease in magnitude. Thus, the relative magnitude of the tail with respect to the other tail(s) may be used to calculate the angle of the pen.

In one or more embodiments of the invention, if the pen is capable of resonating at different resonance frequencies, the sensor module may be configured to drive the sensor electrodes at different frequencies. For example, the sensor module may alternate between frequencies when driving the sensor electrodes. The frequency having the greatest magnitude may be identified as the current resonance frequency of the pen. For example, from a user perspective, consider the scenario in which the pen and application on the host mimics a two color ink pen having colors black and red. The pen may be configured to resonate at a first frequency for black and a second frequency for red. The sensor module may be configured to alternate between driving the sensor electrodes with the first frequency and driving the sensor electrodes with the second frequency. When the user selects the button for the first frequency on the pen, the peak magnitude of the measurements from driving the sensor electrodes with the first frequency is greater than the peak magnitude from driving the sensor electrodes with the second frequency. Thus, the determination module may determine that the pen is resonating at the first frequency and notify the host device, which shows output in black. Conversely, when the user selects the button for the second frequency on the pen, the peak magnitude of the measurements from driving the sensor electrodes with the first frequency is less than the peak magnitude from driving the sensor electrodes with the second frequency. Thus, the determination module may determine that the pen is resonating at the second frequency and notify the host device, which shows output in red. Similar techniques may be used if the pen is configured to use more than two frequencies. In particular, the input device may be configured to alternate between transmitting the sensing signals at the different frequencies.

The track direction or path of the pen may be estimated based on the heading direction of the pen. For example, the track direction may be estimated as approximately 90 degrees clockwise from pen heading. The track direction may vary depending on the language and may be configured.

In one or more embodiments of the invention, handedness of the user may be estimated by comparing the track direction to heading direction once the track direction is determined over several sets of measurements. For a right handed person, the angle between track direction and heading may be about 90 degrees clockwise. For a left handed person, the angle between track direction and heading may be approximately 135 degrees counterclockwise.

In Step 607, the positional information is reported in accordance with one or more embodiments of the invention. In one or more embodiments of the invention, the information may be reported to the host device, a device driver, application, or any other component in accordance with one or more embodiments of the invention. In some embodiments, the current state information is reported as an event, such as a button selection or de-selection. In some embodiments, the current state of the pen may be reported. In some embodiments, the change in state of the pen is reported. In some embodiments, the state of the pen and the change or detection or lack thereof is reported. For example, the information may indicate the state of the pen detected before the pen left the sensing region.

Figure 7:
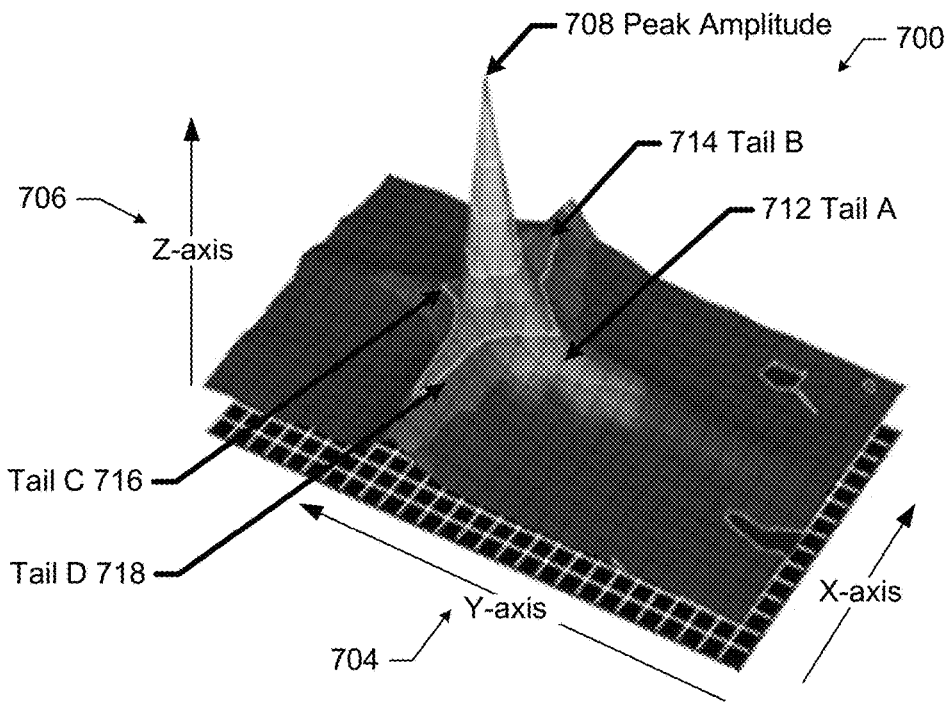
FIGS. 7, 8, and 9 show examples in accordance with one or more embodiments of the invention.
Figure 8:
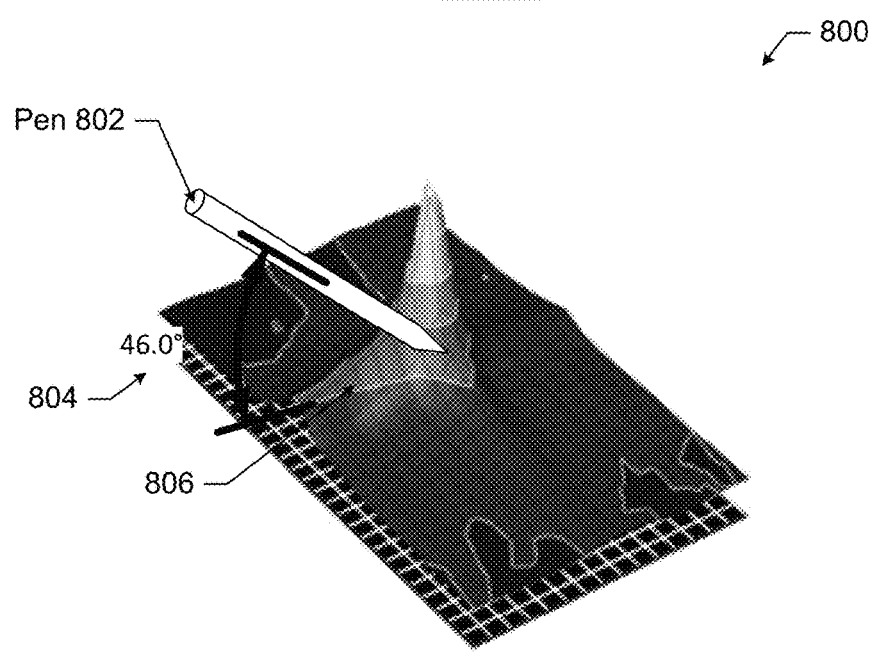
Figure 9:
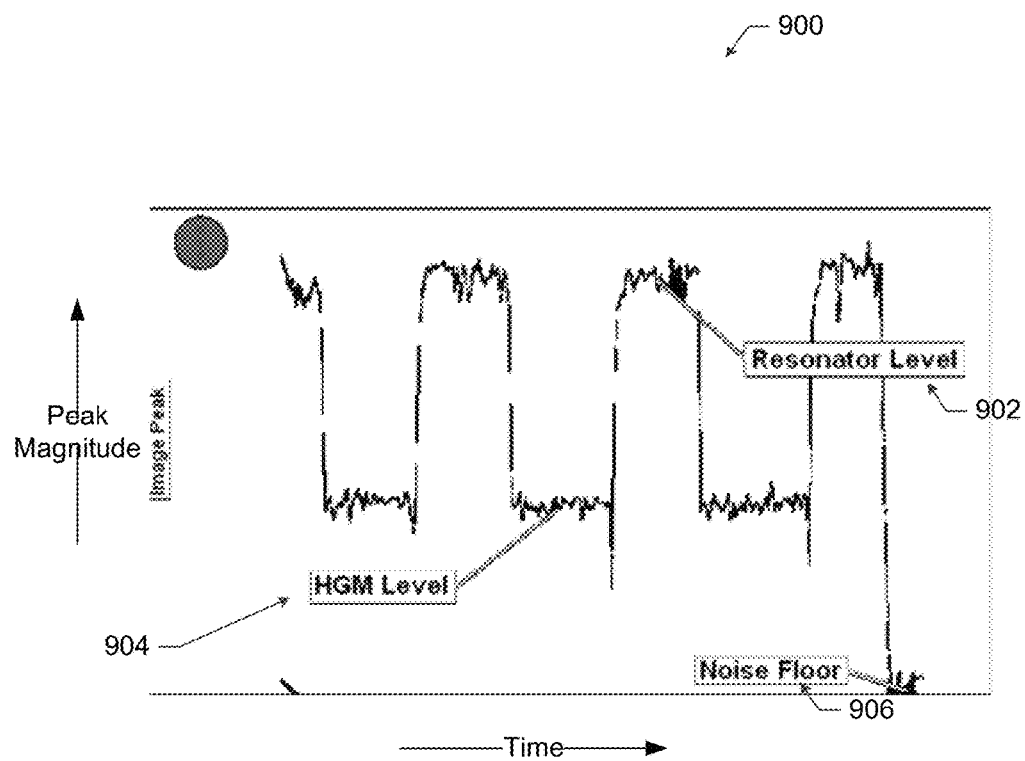

FIGS. 7, 8, and 9 show examples in accordance with one or more embodiments of the invention. The examples are for illustrative purposes only and not intended to limit the scope of the invention.

FIG. 7 shows an example capacitive image (700) generated from a set of mutual capacitive measurements. In particular, FIG. 7 shows an example when a pen has a resonance frequency at the same frequency as used to drive the sensor electrodes. The x-axis (702) and y-axis (704) are parallel to the surface of the sensing region, and thus, reflect locations in the sensing region. The z-axis (706) shows the measurement values as the corresponding locations. The value in the vertical direction represents the measurement values. While resonating, the pen has an elevated signal level and peak amplitude (708). Further, a resonating passive pen (710) may have pattern characteristics such as the four tails (e.g., tail A (712), tail B (714), tail C (716), and tail D (718)) as illustrated in FIG. 7. The tails are the elevated signal protruding from the peak amplitude location. The input device may check for the pattern characteristics in order to verify that a passive pen with inductor at a resonating frequency rather than a small finger or other input object. Further, the input device may check for the pattern in order to verify the sensor electrodes are driven at the resonance frequency of the passive pen.

FIG. 8 shows an example capacitive image (800) for a resonating passive pen (802) at a 46 degree angle (804). In some embodiments, the amplitude of the signal overall, as well as the amplitude of one of the tails relative to the amplitude of other tails, may change based on the angle of the pen. As shown in FIG. 8, the amplitude of Tail X (806) is greater than the other three tails. Thus, based on the relative amplitude of each of the tails, the input device may, to some degree of accuracy, detect the current angle of the resonating passive pen.

In some embodiments, a resonating passive pen is designed to resonate near the frequency of the driving waveform of the sensing signal of the input device or touch sensor. According to factors that may include phase and the Q factor of the pen, the resonance may increase the detectability of the passive pen by a multiplier of 2 or 5, or even drive the delta peak negative. A quality factor, or Q factor, is a parameter that describes the degree to which an oscillator or resonator is under-damped. In other words, the Q characterizes a resonator's bandwidth relative to the resonator's center frequency.

FIG. 9 shows an example waveform screen-shot (900) for a resonating passive pen with a low-Q resonator. The horizontal axis in FIG. 9 is time and the vertical axis is peak magnitude of the received signal. As shown, the signal is repeatedly reduced from the resonator level (902) to the HGM level (904) by altering the resonant frequency of the pen to longer match the frequency at which sensing signals are driven. FIG. 9 also shows the noise floor (906), which is the value of the measurements when no input object, such as pen or finger, is present in the sensing region. The high ground mass state is the normal state of a passive pen with no, or little, resonance occurring. In part due to the Q used in the design, the resonator level (902) is approximately twice that of the high ground mass (HGM) level (904). In some embodiments, the input device may alternate between sensing signal frequencies, one in resonating pen band and one out of resonating pen band, in order to determine if a resonating pen is present in the sensing region. If a significant increase in signal level while in the resonating pen frequency band exists, the input device may assume that a resonating passive pen is present.

Although not shown in FIG. 9, the peak magnitude may increase with the Q of the circuit, and may be several times higher than the HGM level. However, a lower Q may have the benefit, in some embodiments, of being more insensitive to the angle of the passive pen. In certain embodiments, resonant frequency of the system may shift based on the angle of the passive pen. In order to minimize the negative effects of high Q, the sensing signal frequency of the input device may be dynamically adjusted to match the resonating frequency of the high Q resonating passive pen.

The Q of a given pen and input device system may be adjusted for various purposes. For example, the Q may be set to cover a range of frequencies for noise mitigation and/or pen angle changes. Additionally, Q may be configured to maximize the signal to noise ratio for noisy phones or to improve hover detection.

When using a high Q value, the system may become sensitive to parasitic capacitance. In such a scenario, the palm of a user may be detectable several centimeters from the sensing region. Therefore, the system may be used as a proximity sensor in some situations. In some embodiments, a sensor may be added to the palm area of a keyboard and, using a high Q system configuration, palm detection may be performed for wake/sleep, typing vs. pointing modes, or palm rejection from a trackpad or keyboard. Additionally, a high Q configuration may be used on the back of a phone or tablet for hand/finger detection. The hand/finger detection may be utilized for features including activating capacitive buttons/switches that are not visible on the back of the device. The detected information may also be used by the phone or tablet to adjust user interaction or display based on the current orientation of the device, such as whether it is being held or resting on a surface and not being held by the user.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system comprising:
    a sensor module coupled to a plurality of sensor electrodes, the sensor module configured to:
        drive the plurality of sensor electrodes with first sensing signals at a first resonance frequency of a pen comprising an inductor; and
    a determination module configured to:
        obtain, concurrently with the driving of the plurality of sensor electrodes, a first plurality of measurements that are based on effects of the first sensing signals, and a resonance of the pen in a sensing region,
        determine a location of peak magnitude of the first plurality of measurements,
        determine a relative magnitude of a first tail with respect to at least a second tail, the first tail and the at least the second tail having increased measurements extending outward from the location of peak magnitude,
        determine a heading direction of the pen with respect to the sensing region, the heading direction being in an opposing direction of the first tail,
        determine a track direction of the pen,
        determine a handedness of a user by determining whether the angle between the track direction and the heading direction is approximate to 90 degrees clockwise or 135 degrees counterclockwise,
        determine positional information of the pen in the sensing region based on the first plurality of measurements, and
        report the positional information of the pen.

2. The processing system of claim 1, wherein the sensor module is further configured to:
    drive the plurality of sensor electrodes with second sensing signals at the first resonance frequency,
    wherein the determination module is further configured to:
        obtain a second plurality of measurements that are based on effects of the second sensing signals and the pen in the sensing region,
        determine, based on relative magnitude of the second plurality of measurements with respect to the first plurality of measurements, a selection of a button on the pen, and
        report the selection of the button to a host device.

3. The processing system of claim 1, wherein the sensor module is further configured to alternate between the first resonance frequency and a second resonance frequency when driving the plurality of sensor electrodes.

4. The processing system of claim 1, wherein the determination module is further configured to:
    determine, based on the relative magnitude, an angle of the pen with respect to the sensing region, wherein the positional information comprises the angle of the pen with respect to the sensing region.

5. A system comprising:
    a pen comprising:
        a pen body;
        a tip disposed at an end of the pen body;
        a first circuit segment for coupling the tip to a ground via the pen body;
        a second circuit segment comprising an inductor;
        a trim capacitor configured for a first resonance frequency;
        a switch configured to change between a first state and a second state,
        wherein the first state connects the second circuit segment to the tip, and wherein the second state connects the tip to the first circuit segment bypassing the second circuit segment; and
a selectable button to alternate the switch between the first state and the second state,
wherein the pen has the first resonance frequency in the first state;
an input device comprising:
sensor circuitry configured to:
transmit first sensing signals at the first resonance frequency of the pen, and a processing system configured to:
drive the plurality of sensor electrodes with the first sensing signals at the first resonance frequency of the pen,
obtain, concurrently with the driving of the plurality of sensor electrodes, a first plurality of measurements that are based on effects of the first sensing signals, and a resonance of the pen in a sensing region,
determine a location of peak magnitude of the first plurality of measurements,
determine a relative magnitude of a first tail with respect to at least a second tail, the first tail and the at least the second tail having increased measurements extending outward from the location of peak magnitude,
determine a heading direction of the pen with respect to the sensing region, the heading direction being in an opposing direction of the first tail,
determine a track direction of the pen,
determine a handedness of a user based on the angle between the track direction and the heading direction,
determine positional information of the pen in the sensing region based on the first plurality of measurements, and
report the positional information of the pen.

6. The system of claim 5,
wherein the pen has a second resonance frequency in the second state,
wherein the sensor circuitry is further configured to:
transmit second sensing signals at the second resonance frequency, and
wherein the processing system is further configured to:
obtain a second plurality of measurements that are based on effects of the second sensing signals and the pen in a sensing region,
determine a selection of the selectable button based on the second plurality of measurements, and
report the selection of the selectable button.

7. The system of claim 6,
wherein the selectable button is located on the pen body proximate to the tip.

8. The system of claim 6,
wherein the selectable button is located on the tip.

9. The system of claim 5, wherein the pen includes a compressible material, wherein compression of the compressible material alters the first resonance frequency of the pen.

10. The system of claim 5,
wherein the sensor circuitry is further configured to:
transmit second sensing signals at the first resonance frequency, and
wherein the processing system is further configured to:
obtain a second plurality of measurements that are based on effects of the second sensing signals and the pen in a sensing region,
determine the track direction based on the heading direction and the second plurality of measurements, and
report the track direction.

11. The system of claim 5, wherein the input device is further configured to alternate between the first resonance frequency and a second frequency when transmitting sensing signals.

12. The system of claim 5, wherein the pen further comprises:
a selectable knob connected to the trim capacitor and configured to alter, using the trim capacitor, the first resonance frequency to a plurality of resonance frequencies.

13. The system of claim 5, wherein the processing system is further configured to:
determine, based on the relative magnitude, an angle of the pen with respect to the sensing region, wherein the positional information comprises the angle of the pen with respect to the sensing region.

14. A passive pen comprising:
a pen body;
a tip disposed at a first end of the pen body;
a first circuit segment for coupling the tip to a ground via the pen body;
a second circuit segment comprising an inductor;
a trim capacitor configured for a resonance frequency;
a switch configured to change between an open state and a closed state,
wherein the open state connects the tip to the first circuit segment bypassing the second circuit segment by connecting the tip to the ground, and
wherein the closed state connects the second circuit segment to the tip and isolates the first circuit segment; and
a button, connected to the switch, the button having a pressed position and a not pressed position, the not pressed position corresponding to the open state of the switch,
wherein the passive pen has the resonance frequency in the closed state.

15. The passive pen of claim 14, wherein the trim capacitor is in the second circuit segment.

16. The passive pen of claim 14, wherein the passive pen further comprises:
an adjustable trim capacitor connected to a knob disposed on the pen body for tuning the resonance frequency.

17. The passive pen of claim 14, wherein the button is located on the pen body and proximate to the tip.

18. The passive pen of claim 14, wherein the button is located on the tip.

* * * * *